United States Patent [19]

Dievendorff et al.

[11] Patent Number: 5,465,328
[45] Date of Patent: Nov. 7, 1995

[54] FAULT-TOLERANT TRANSACTION-ORIENTED DATA PROCESSING

[75] Inventors: Richard Dievendorff; Chandrasekaran Mohan, both of San Jose, Calif.

[73] Assignee: International Business Machines Corporation, Armonk, N.Y.

[21] Appl. No.: 181,521

[22] Filed: Jan. 14, 1994

[30] Foreign Application Priority Data

Mar. 30, 1993 [GB] United Kingdom ................. 9306649

[51] Int. Cl.$^6$ ................................................. G06F 11/00
[52] U.S. Cl. ..................... 395/182.13; 395/600; 395/650
[58] Field of Search .................................. 395/575, 600, 395/650; 371/12; 364/282.4, 282.1, 281.3

[56] References Cited

U.S. PATENT DOCUMENTS

| | | | |
|---|---|---|---|
| 4,945,474 | 7/1990 | Elliott | 364/200 |
| 5,258,982 | 11/1993 | Britton et al. | 370/110.1 |
| 5,261,089 | 11/1993 | Coleman et al. | 395/600 |
| 5,319,773 | 6/1994 | Britton et al. | 395/575 |
| 5,333,303 | 7/1994 | Mohan | 395/575 |

Primary Examiner—Robert W. Beausoliel, Jr.
Assistant Examiner—Glenn Snyder
Attorney, Agent, or Firm—Stephen T. Keohane

[57] ABSTRACT

In transaction processing systems, it is known for resource-updating operations within a transaction to be backed out at the request of an application program following detection of error conditions during processing of the transaction. If the error condition is very likely to recur, it may be undesirable for the operations request to be presented to the application exactly as before. A transaction-oriented data processing system and a method of transaction-oriented data processing are provided in which operation requests or data packets may be marked to be excluded from the effects of application-requested backouts.

10 Claims, 5 Drawing Sheets

FAULT-TOLERANT TRANSACTION-ORIENTED DATA PROCESSING

BACKGROUND OF THE INVENTION

The present invention relates to fault-tolerant transaction-oriented data processing, and in particular to a method of processing and a transaction-oriented data processing system such as a transaction-oriented messaging system, file system, or database system, which deals adequately with application-detected error conditions.

Many business functions can be implemented by transaction processing as application-oriented computer programs. Commercial application programs typically process many similar items, such as seat reservations in an airline booking system or requests for funds withdrawal at an automated teller machine (ATM). The processing of one of these items (i.e. the execution of a discrete unit of processing that constitutes a logical entity within an application) is a transaction.

Most application-oriented programs need to access some form of computer system facilities (facilities such as processors, databases, files, queues, input/output devices, other application programs)—which are generically known as resources. The system software which controls these resources is generically known as the resource manager. A common processing requirement is to be able to make a coordinated set of changes to two or more resources—such that either all of the changes take effect, and the resources are moved to a different consistent state, or none of them does. The user must know which of these two possible outcomes was the actual result. In the example of a financial application to carry out a funds transfer from one account to another account held in the same system, there are two basic operations that are carried out by a single process: the debit of one account and the credit of the other. Normally both of the operations succeed, but if one fails then the other must also not take effect, or data integrity is lost. The failure might be for operational reasons, for example one part of the system being temporarily unavailable, in which case the transaction request can be presented again later. Alternatively, it might be because there are insufficient funds in the account to be debited, in which case a suitable response should be returned to the initiator of the transaction request.

A sequence of associated operations which transforms a consistent state of a recoverable resource into another consistent state (without necessarily preserving consistency at all intermediate points) is known as a "unit of work". Transaction processing is the management of discrete units of work that access and update shared data. The characteristic of a transaction being accomplished as a whole or not at all is termed "atomicity". Another characteristic of transaction processing which is important for maintaining data integrity is consistency—i.e. the results of a transaction must be reproducible and predictable for a given set of conditions, and any transaction which successfully reaches its end must by definition include only legal results.

A known method of ensuring atomicity of a transaction is to initiate performance of file updates within the transaction only after verifying that the updates can be completed successfully. In the example of an ATM funds withdrawal, no updates to the records of either the ATM cash balance or the customer account balance would be made until it has been verified that sufficient funds are available in each of the records accessed in the transaction. Despite the apparent simplicity of this solution, it is not always possible to carry out checks before performing the resource updates. There are many circumstances in which advance testing of whether a transaction will successfully complete would entail unacceptable delays in processing, such as in file systems which only permit one request for initiation of a transaction to be outstanding at a time, particularly because resources must be locked (i.e. updating access by other applications must be prevented) between initiation of the test and the subsequent update.

Another solution provided in fault-tolerant transaction processing systems is for resource updates to be made without prior checking of whether the transaction can successfully complete, but for them to be made permanent and visible to other applications only when the transaction does complete successfully; the application issues a COMMIT operation on successful completion of the transaction, confirming all updates. If the transaction fails to complete successfully, then all changes that have been made to resources during the partial execution are removed: the transaction is said to BACKOUT (or synonymously to ROLLBACK), the resources being restored to the consistent state which existed before the transaction began by removing changes in the reverse chronological order from which they were originally made. This backward recovery facility is an essential part of the control over the commitment of changes in a system which applies resource updates without advance testing.

The commit procedure will be a single-phase procedure if only one resource manager is involved—the transaction manager simply tells the resource manager to commit all changes made by the transaction. If two or more data resource managers are involved in a single transaction, the transaction processing system needs a more complex commitment control process: a two-phase commit procedure in which the system asks each resource manager to prepare to commit and then, when each resource manager has signalled readiness, asks each to commit. If any resource manager signals that it cannot commit, the transaction processing system asks each of them to backout.

Often, several concurrently running transactions can update different records that are under the control of a single data resource manager. The data resource manager must support an efficient means of sharing, and at the same time prevent any two transactions from updating the same record simultaneously (a transaction must finish updating a record before any other transaction starts to update it. The most commonly used method of achieving such concurrency control is locking, in which a given resource (e.g. a message or a record in a file) is reserved to one transaction instance at a time. A commit-duration lock is acquired on a resource before it is updated. No other transaction may access this locked resource until the unit of work completes. All commit-duration locks are generally released as the final step of a COMMIT or BACKOUT operation, at the end of the unit of work.

The locking service may also provide allocation-duration or "long-duration" locks. Long-duration locks are held until explicitly released or the requester terminates, and may span multiple units of work. A transaction instance may concurrently hold a commit-duration lock and an allocation-duration lock for the same lock name; in such circumstances that lock becomes available to other transaction instances only when the holder releases both the commit-duration and allocation-duration use of the lock.

It is known for a set of resources that are to be locked to be organised in a hierarchy. Each level of the hierarchy is given a node type which is a generic name for all the node instances of that type. A sample lock hierarchy may be represented as follows:

The database has area nodes as its immediate descendants; each area in turn has file nodes as its immediate descendants; and each file has record nodes as its immediate descendants. Each node has a unique parent.

Each node of the hierarchy can be locked. If exclusive (X) access to a particular node is requested, then when the request is granted, the requester has exclusive access to that node and implicitly to each of its descendants. If a request is made for shared (S) access to a particular node, the granting of the request gives the requester shared access to that node and implicitly to each of its descendants. Thus, these two access modes lock an entire hierarchy subtree rooted at the request node.

In order to lock a subtree rooted at a first node in share or exclusive mode it is important to prevent locks on the ancestors of the first node which could implicitly lock the first node and its descendants in an incompatible mode. For this, the Intention Access (I) mode is introduced. Intention mode is used to lock all ancestors of a node to be locked in share or exclusive mode. The IS or IX locks signal the fact that locking is being done at a finer level and thereby requires these implicit or explicit exclusive or share locks on the ancestors.

The protocol to lock a subtree rooted at a first node in exclusive (X) mode is firstly to lock all ancestors of the first node in intention exclusive (IX) mode and then to lock the first node in exclusive (X) mode. For example, in a message queuing inter-program communication system in which a queue contains messages organised in disk blocks called "pages", to exclusively (X) lock a particular message we must first acquire an intention exclusive (IX) lock on the queue, then acquire an IX lock on the page which contains the message and then acquire an exclusive (X) lock on the message itself.

Message queuing is a method of inter-program communication in which the ability to BACKOUT resource updates if a transaction is unable to complete successfully is sometimes provided, although not all messaging and queuing systems are transaction-based. Message queuing allows programs to send and receive application-specific data, without having a direct connection established between them. Messages, which are strings of bits and bytes that have meaning to one or more application programs, are placed on queues in storage so that the target applications can take them from the message queues and process them when they choose (rather than when the sending program chooses). The programs can then run independently of each other, at different speeds and times. Since the sending application is not constrained to check prior to sending a message whether the transaction can successfully complete, and the target application is similarly able to take a message from a queue without prior checking, a backout facility is often required (although not, of course, if the message is merely an enquiry making no changes to a system's resources).

In a transaction-based messaging system, in which operations to take messages from a queue are necessarily part of the unit of work carried out by an application, it is sometimes difficult to write applications which deal well with application-detected error conditions requiring BACKOUT of resource updates, and in particular it is difficult to deal with the initial operation for obtaining messages from a queue (the GET MESSAGE operation) that started the transaction. "Error conditions" in this context is intended to cover any application-detected reason for the unit of work not being completed successfully. In the example of an ATM funds withdrawal, one such data related "error condition" might be the user entering an incorrect personal identification number (PIN) or one of the accounts to be updated having insufficient funds.

Considering our example of an ATM transaction for funds withdrawal, the steps of the transaction executed by a server processor using messaging and queuing (following a request for funds withdrawal made by a customer at the ATM, and the ATM subsequently putting a request for processing of the transaction onto the server's queue) may be as follows:

1. GET MESSAGE from ATM (i.e. collect the message that the ATM put onto a queue)
2. UPDATE (decrease) ATM cash balance record.
3. UPDATE (decrease) customer account balance record.
4. PUT MESSAGE instructing ATM to dispense cash (i.e. put a message onto the ATM's incoming message queue).
5. COMMIT, which deletes from the server's queue the input message from the ATM, makes permanent the file updates, and makes the output message available on the ATM's message queue.

Should the first file update step (2) cause the ATM's cash balance to become negative or the second file update step (3) cause the customer's account balance to become negative, the transaction cannot complete successfully and cash should not be dispensed. The application detecting data-related difficulties such as this after performing other file updates within the unit of work should issue BACKOUT to undo the file updates before they are committed. However, the known BACKOUT operation also backs out the initial GET MESSAGE step, putting the message back onto the queue.

This is not a problem if the transaction is backed out for some other reason, such as a system failure or the application terminating abnormally, since in such instances it is necessary for the full message to be backed out onto the queue to be represented to the application. However, if the backout was requested by the application following detection of an error condition, each succeeding attempt to execute this transaction with the same input message and file content would be very likely (at least) to result in an application-issued BACKOUT for the same reason—insufficient funds—and so the problem of the data related error condition has not been solved.

A solution to this problem is to have the transaction BACKOUT, then issue GET MESSAGE again for the application to perform a different action, such as to report the error to the initiator of the transaction request. This technique is shown by Reuter in FIG. 1 on page 50 of "Principles of Transaction-Oriented Recovery", Computer Science, RJ 4214 (46292), 1984. That solution fails (although not necessarily in every instance) in cases where multiple instances of this transaction are active, all getting messages from the same input queue: if a server instance issues BACKOUT, the input message is unlocked, and the message may be taken from the queue by another server instance before the transaction that issued BACKOUT can again issue GET MESSAGE for the message that causes the transaction failure.

Another solution is described by Bernstein et al in "Implementing Recoverable Requests Using Queues", Digital Equipment Corporation, 1990, on page 117. Bernstein augments the GET MESSAGE service with a BACKOUT counter for recording the number of times that the message is backed out. After the transaction has backed out some number of times, the message is moved to an error queue where it can be handled differently. Bernstein's approach requires that the transaction be attempted a number of times, when one attempt is all that is needed to diagnose an application-detected error of this nature. This solution also requires special logic to change the state of the stored message in the BACKOUT case (i.e. changing the BACKOUT counter associated with the message). Changing the state of stored data during BACKOUT is not strictly consistent with the notion that BACKOUT of a transaction returns stored data to its pre-transaction state.

It has been suggested that one possible solution to the problem of how to deal with application-detected errors requiring BACKOUT of resource updates is to perform the initial GET MESSAGE before beginning the transaction, or to COMMIT after performing the initial GET MESSAGE. Although preventing the message being backed out onto the original queue, this solution is unacceptable as it might result in loss of the input message if the system or application should fail after committing the GET MESSAGE operation but before creating the response message and completing COMMIT, since committing the GET MESSAGE operation deletes the message from the queue.

Another suggested solution is to provide services for use by an application program to establish "savepoints" within a transaction and to backout to these savepoints rather than backout the whole transaction. Backing out the transaction to the latest savepoint will reverse only those changes made after the most recent request to establish a savepoint. Such an application for the ATM funds withdrawal could be written as:

1. GET MESSAGE
2. Establish Savepoint
3. UPDATE ATM cash balance
4. UPDATE customer account balance
5. PUT MESSAGE instructing ATM to dispense cash
6. If updates were successful (no negative balances) then
   * COMMIT
7. Else (one or more file updates resulted in negative balance)
   * Backout to Savepoint
   * PUT MESSAGE instructing the ATM to display error message
   * COMMIT.

This solution is provided by IBM's Information Management System (IMS) which is described in IMS/ESA General Information GC26-4275, available from IBM. Implementation of the mid-transaction syncpoint concept requires that all unit of work participants implement this paradigm—a syncpoint is a point of logical consistency between all of the participants and so it cannot be implemented by a single resource manager in isolation. Some applications do not match the syncpoint requirement well. For example, some applications will follow each GET MESSAGE operation with a database update, and then issue GET MESSAGE again and carry out another update, and so on. Having to synchronize with other applications following each GET MESSAGE operation could introduce unacceptable processing delays for all of the associated applications.

Thus, there exists a need to provide a method of fault-tolerant transaction processing which deals adequately with application-detected error conditions which require backouts of resource updates and which error conditions would be very likely to recur or would definitely recur if the transaction were restarted with the same initial state of the system resources and the same input requests.

SUMMARY OF THE INVENTION

The present invention provides a method of fault-tolerant transaction-oriented data processing and a fault-tolerant transaction-oriented data processing system in which resource updates performed by a first application program are made permanent and visible to other application programs only on successful completion of the transaction, and are backed out following discovery of an error condition prior to successful completion, the method comprising the steps of:

initiating execution by said first application program of a first unit of work;

specifying whether an operation within said first unit of work is to be excluded from the effects of application-requested backouts following detection of error conditions;

responsive to detection of an error condition by said first application program, backing out resource updates performed in said first unit of work whilst ensuring that any excluded operation is not made available to other application-oriented programs;

initiating a unit of work which includes said excluded operation, to enable further processing by the application.

Preferably, excluded operations are prevented from being made available to other applications by allocation-duration locks which are acquired on the excluded operations by said first application program. In a preferred implementation of the present invention, the whole of the unit of work which contained an error condition is backed out following detection of an error condition by the application program so that the unit of work which is initiated after application-requested backout is a new unit of work.

In an alternative embodiment of the present invention, the specified excluded operations are themselves not backed out when the application requests a backout of resource updates. Any commit-duration locks that were acquired on the excluded operations in the first unit of work are not released and so the operations are not made available to another application. In such an embodiment, the unit of work which is initiated after application-requested backout (and which includes the excluded operations) is a reconstruction or continuation of the partially backed out unit of work.

The new (or continued) unit of work is preferably not constrained to include commitment of specific actions—what actions are to be performed in this new unit of work is instead determined by the particular application program. However, one significant possibility that is enabled by the method according to the present invention is for transaction processing requests which cannot be successfully completed to be rejected by an application in such a way that the request is not re-presented in the same form to the application.

The step of specifying whether an operation or operations are to skip the effects of application-requested backout preferably comprises marking specific operation or transaction requests and then storing a list of marked operation or transaction requests. On application-requested backout of resource updates, this list is examined to determine whether the unit of work includes any operation which is to be excluded from the effects of the backout. Preferably, multiple operation requests in any one unit of work may be marked to avoid application-requested backouts (the unit of work may also include several unmarked operations and transaction requests or none), and it is preferred that transaction-initiating requests in particular may be so marked. It will be sufficient for some applications if each unit of work can include only one marked message, but this is not always the case: it may be desirable to provide for different system responses following the raising of different error conditions by a variety of marked messages of a unit of work.

Marked operation or transaction requests are desirably left unmarked following the application-requested backout, so that the requests are not treated differently to other elements of the new (or continued) unit of work in the eventuality of a backout of that unit of work. It may be desirable to constrain the new unit of work so that the application cannot mark operations to skip backout a second time.

The method of the present invention does not prevent backouts of any elements of the unit of work if the backout occurs for some other reason than application detection of an error condition, for example the application abnormally terminating or the system being restarted. Thus, backout operations that occur for such other reasons undo the whole unit of work. If the original unit of work is subsequently committed, a marked operation or transaction is committed in the same way as unmarked ones.

In an implementation of the present invention in a transaction-oriented messaging and queuing system wherein a marked operation may be a transaction-initiating operation (i.e. a request for taking a message from a queue), committing the unit of work which is initiated following application-requested backout preferably causes any previously marked transaction-initiating operation to be committed; so that the message which raised an error condition is deleted from the message queue and is not constrained to be re-presented to the application to be processed in the same way as before. In addition to deleting the message from the queue, the new (or continued) unit of work may include the step of notifying the initiator of a transaction request of the occurrence of an error. The system is thus enabled to effectively throw away any messages containing marked operations that raise error conditions and to raise an explanatory response.

The new (or continued) unit of work may also include other actions, such as the updating of an audit count (one example of this being logging each attempt by an ATM customer to withdraw funds when the balance of their account is too low or when the input personal identification number is not correct, with the application instructing the ATM to retain the customer's ATM accessing card after a certain number of withdrawal attempts). Backouts that occur for any reason other than an application-detected error condition ignore any marks so that a marked message is reinstated on the queue in the same way as unmarked ones.

For some applications, the method of the present invention can be implemented by making the marking of messages an option associated with the issuing of a transaction-initiating operation request. For other applications it may be preferred to initiate transactions and then determine whether any operations within the unit of work should be marked to be excluded from backouts.

BRIEF DESCRIPTION OF THE DRAWINGS

The present invention will now be described in more detail, by way of example only, with reference to the accompanying drawings in which.

DETAILED DESCRIPTION OF THE PREFERRED EMBODIMENT

Figure 1:
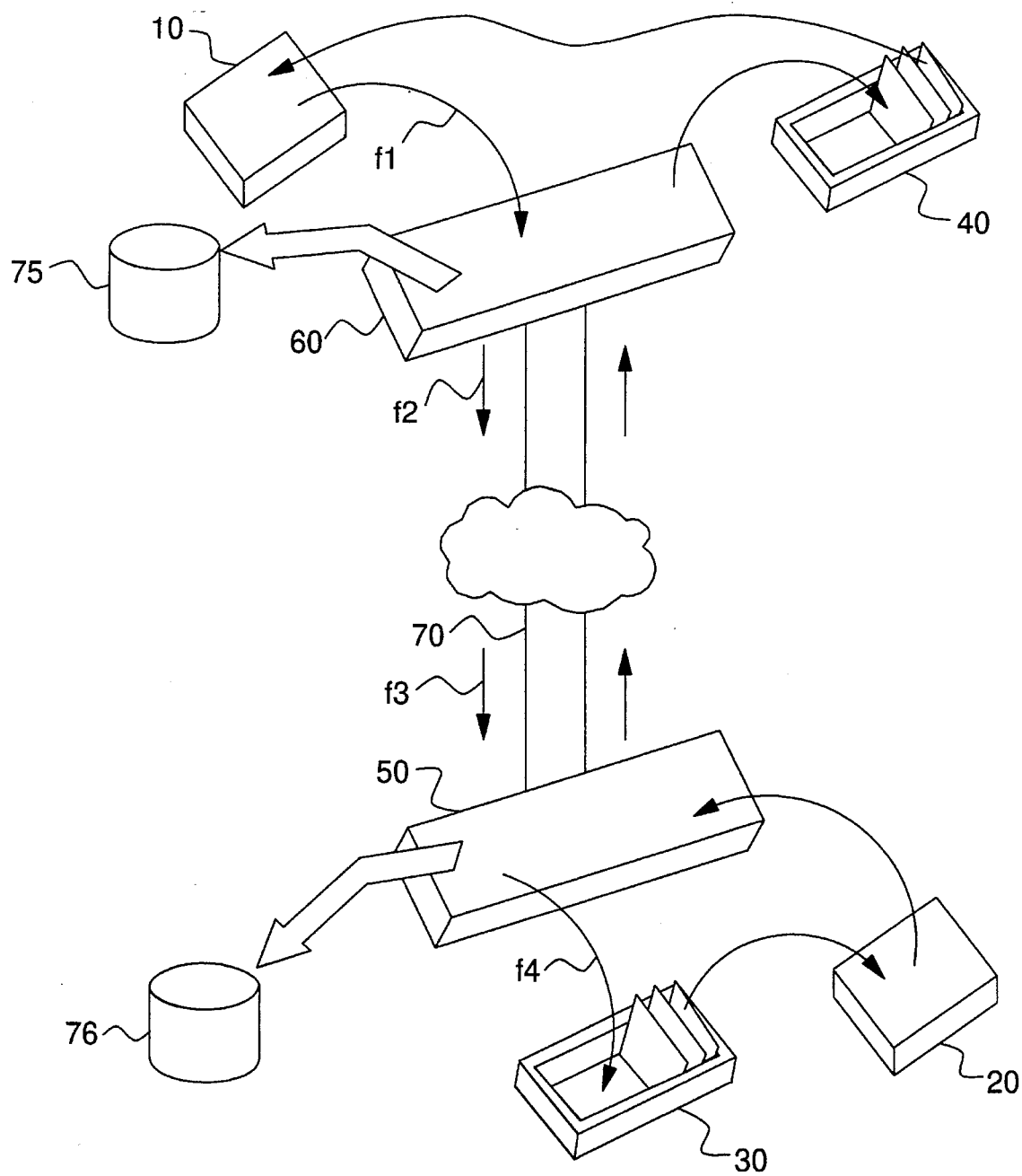
FIG. 1 is a schematic representation of two programs communicating with each other using messaging and queuing.

As noted previously, message queuing is a method of inter-program communication which allows programs to send and receive application-specific data without having a direct connection established between them. Before describing the detail of a specific implementation of the present invention in a messaging and queuing system, it will be helpful to describe the general methodology of inter-program communication using messaging and queuing.

Application programs view the string of bits and bytes that make up a message as consisting of a sequence of "items", each item having a particular data type and meaning. For example, the first item might be a four-byte unsigned binary integer containing an account number; the second item might be a twenty-byte character string containing a customer name. This data is called the application data.

In addition to the application data, a message has associated with it some ancillary data. This is information that specifies the properties of the message, and is used by the message queuing service to decide how the message should be processed. Some of this information must be specified by the application (for example, the destination of the message).

A message queue is a named "object" in which messages accumulate, and from which they are later removed. Each queue belongs to one particular queue manager, which is responsible for the maintenance of that queue. The queue is identified by its name. A queue manager can own many queues, but each queue must have a name that is unique within the queue manager instance that owns the queue. A message queue is not merely a stack—when messages are added to a queue, they are added at the end, and when messages are removed from a queue, they are normally removed from the front. However, facilities do exist that allow messages to be read from the queue in other than the order in which they occur on the queue. For example, an application may need to process the reply to a particular message. In this case the application can retrieve this message from the queue, even though it is not the first one on the queue.

The physical representation of a message queue depends on the environment, but can be a buffer or buffers in main storage, a file or files on disk or other permanent storage device, or both of these. However, the physical management of message queues is entirely the responsibility of a queue manager (the system service that provides the message-queuing facilities used by applications), and such details are not made apparent to the application program. Applications can view a message queue simply as a "black box" in which messages accumulate. Applications have no access to message queues other than through the message-queuing calls (such as MQGET for taking messages from a queue and MQPUT for sending messages to a queue). Applications obtain message-queuing services by using the message-queuing calls to communicate with the queue manager that is installed on the same system as the application (the local queue manager).

For message-queuing services to be available, there must be at least one queue manager on a system. However, it is quite possible to have more than one queue manager on a system (for example, in order to keep development work separate from production work). Each different queue manager instance is known by its name. Generally, this name must be unique within the network of interconnected queue managers, so that one queue manager can unambiguously identify the target queue manager to which any given message should be sent.

Applications communicate by agreeing to use particular named message queues, sending messages to the specific queues that the specific target programs have agreed to read from. The location of these queues is not apparent to the applications which send the messages; each application interacts only with its local queue manager, and it is the network of interconnected queue managers that is responsible for moving the messages to the intended queues.

FIG. 1 is a representation of the flow of messages between two communicating programs in a message queuing system in the simple example of one-to-one communication. The two programs 10,20 send messages to each other via queues 30,40 under the control of respective queue managers 50,60. The first program 10 puts messages onto the second program's queue 30 without a dedicated logical connection having to be established between the programs (this message flow is represented in FIG. 1 by arrows f1, f2, f3 and f4). The queue managers 50,60 ensure that the messages are moved across the network, such that the programs themselves are shielded from network variations and complexities. This is represented in FIG. 1 by network link 70. Program 20 takes the messages from the queue 30 to process them when it is ready rather than when the sending program 10 chooses. Any changes made to recoverable resources by the transfer of messages and subsequent processing are recorded in recovery logs 75,76 for use in the event of a subsequent failure.

In messaging and queuing, a program communicates with another program by putting a message on the second program's message queue (or one of them if a plurality of queues are open). The target program receives the communication by taking the message from the queue. All of the activity associated with making this happen—the work involved in maintaining message queues, in maintaining the relationships between messages and queues, in handling network failures and restarts, and in moving messages around the network—can be handled by the queue manager. Since cross-network communication sessions are established between queue managers rather than between individual programs, programs are less vulnerable to network failures than in certain other types of inter-program communication. If a link between processors fails, it is the job of the queue managers to recover from the failure. Programs on the affected processors are not brought to a halt by such an event. In fact they need not be aware that it has happened.

In messaging and queuing, there are no constraints to application structure. Two-way reciprocal communication is possible, as well as one-way message flow, as shown in FIG. 1. A separate queue 30,40 exists for receipt of messages for each of the programs 10,20. Additionally, the communication can be one-to-many (such as where three copies of a single program are running concurrently for load-balancing purposes, and may be taking messages from the same queue), or many-to-one (such as if there are multiple clients sending messages to a single server), or a combination of all of these relationships.

Figure 2:
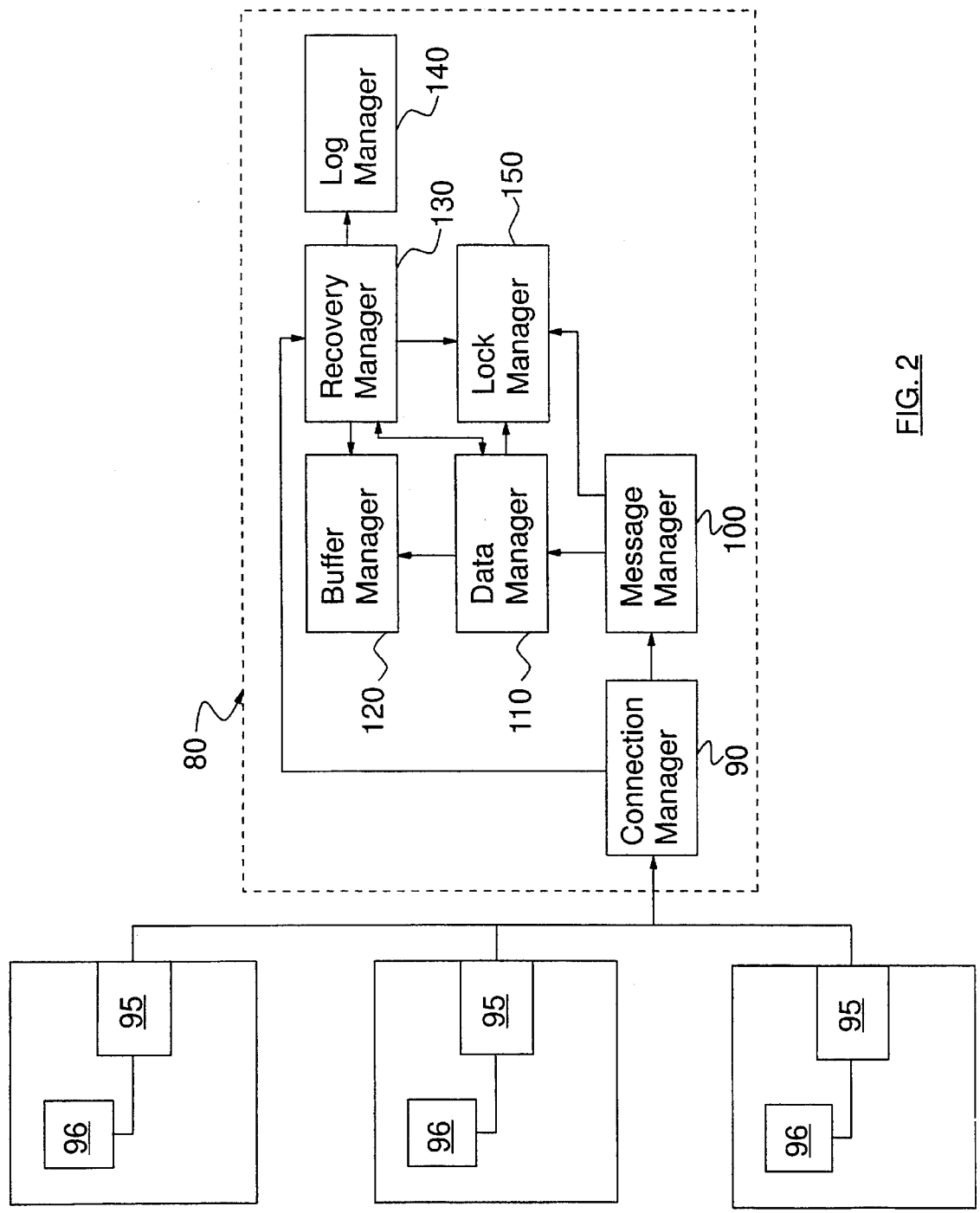
FIG. 2 is a schematic representation of the components of a fault-tolerant transaction-oriented data processing system and their interrelationships, according to an embodiment of the present invention.

A resource management subsystem 80 for a message queuing transaction-oriented data processing system includes the following components, as represented in FIG. 2:
A Connection Manager Component (CMC)

The connection manager 90 provides the interface for adapter components 95 to connect to the subsystem address space. All requests from application programs 96 enter the resource manager subsystem 80 through the connection manager 90. The connection manager monitors termination and so observes application termination.

The connection manager calls a message manager 100 when it requires message queuing interface (MQI) verbs such as MQPUT (the request to enqueue messages on a named queue—i.e. to PUT MESSAGEs) or MQGET (the request to dequeue—i.e. GET MESSAGE).

The connection manager calls a recovery manager 130 to execute the following operations: commit and backout following requests issued by an application; commit when it detects normal termination of an application; and backout when it detects abnormal termination, The connection manager 90 is invoked at different entry points for application-issued BACKOUT and for BACKOUT when triggered by abnormal termination of an application.
A Message Manager Component (MMC)

The message manager 100 provides messaging services for most MQI requests (including MQGET, MQPUT, MQOPEN to open a queue, and MQCLOSE to close a queue). The message manager performs request validation, for example checking that a named queue is open before permitting messages to be put to the queue. The message manager enforces message length and queue depth constraints.

The message manager 100 calls a data manager 110 to insert a message onto a queue or to retrieve a message from a queue. The message manager does not participate in COMMIT or BACKOUT. The message manager performs no logging and very little locking.
Data Manager Component (DMC)

The data manager 110 is concerned with the organisation and recovery of data on disk. The data manager maintains linked lists of disk blocks called "pages" that represent a queue. The data manager performs space management functions, including maintaining an inventory of used and available pages.

The data manager 110 is called by the message manager 100 to insert a message onto a given queue during MQPUT, and is called by the message manager to search for a message on a given queue during MQGET. The data manager 110 performs a search using selection criteria specified by the message manager 100.

The data manager calls a lock manager 150 to acquire commit-duration locks on pages and disk records (messages). Typically, an Intention Exclusive (IX) lock is acquired on a queue, an IX lock is acquired on the page containing the message, and an Exclusive (X) lock is acquired on a logical record (message) within a page during MQGET and MQPUT.

During MQGET, the data manager scans a queue for an undeleted message that matches the search criteria. When such a message is found, an IX lock is requested for a page and an X-lock is requested for that message. If the locks are not granted, it means that the message, although present and not deleted, has not yet been committed by the issuer of MQPUT, and the data manager steps to another message.

A space reclamation operation scans the head of queues after all the messages on a page have been gotten and marked deleted and returns these pages to the free page pool, and updates the appropriate links in surrounding pages. It is important not to remove pages until all the MQGET operations that deleted the messages have reached the COMMIT point, for if a transaction BACKS OUT, we must remove the delete mark from the message and make it eligible for MQGET once again.

The data manager's space reclamation process uses the lock manager 150 to verify that a given page is not in use by another transaction. When a page full of deleted messages is encountered by the space reclamation process, the lock manager is asked for an exclusive lock (X-lock) on the page. If that lock is granted, that means no other transaction has an IX-lock on the page. MQGET and MQPUT acquire commit-duration IX locks on pages affected, so space is not prematurely reclaimed.

A Buffer Manager Component (BUFF)

The buffer manager 120 manages page buffers—i.e. controls the movement of data pages between auxiliary (DASD) storage and virtual storage in response to requests from the data manager 110, in a manner that is consistent with the system's requirements for data recovery while providing adequate performance. The data manager does not deal with disk blocks on disk, only with the buffers managed by the buffer manager 120. All disk input and output (I/O) operations to the queue file are performed by buffer manager.

The buffer manager keeps the "most recently referenced" pages in a virtual storage buffer pool, and writes the "least recently used" to non-volatile storage.

The buffer manager does not concern itself with the content of the disk pages; it does not know if a given page is allocated to a given queue or is on a free list (i.e. whether the page is locked); those topics are the concern of data manager.

The buffer manager is informed by the data manager when a given page should be brought into a buffer and when the data manager no longer requires access to that page. These operations are termed "pin" and "unpin". When the data manager "pins" a buffer, the buffer manager brings a page into a buffer from disk (if it is not already in a buffer) and keeps it in the same place until a matching "unpin" operation is received from the data manager.

The data manager informs the buffer manager when it changes a buffer's content. This operation, termed "Set Write Intent," informs the buffer manager that the disk page should (eventually) be written to disk. A buffer that has had Write Intent set but has not yet been written to its disk slot is called a "dirty" buffer.

The data manager records in a known location in a page the log record address (called a Log Sequence Number) of a recovery log manager (RLMC) 140 log record for the most recent change to a page (a dirty page). When the buffer manager decides because of "Least Recently Used" criteria that a given "dirty" buffer is to be written to DASD, it first invokes the log manager function to "force" (i.e. write to non-volatile memory) the log record whose address is in the dirty page. Thus, the log record necessary to UNDO any change to the page is written to a non-volatile log file before the (possibly uncommitted) updated page is written to the queue dataset. This is called the "Write-Ahead Log (WAL)" rule.

A Recovery Manager Component (RMC)

The recovery manager 130 maintains a list of active transactions (termed units of recovery or, synonymously, units of work), and coordinates the state changes that these transactions go through, stepping them through a two-phase commit protocol. The recovery manager writes log records (via the recovery log manager component, RLMC 140) to record the start of a transaction (BEGIN_UR; where UR is an abbreviation of unit of recovery), beginning of commit phases 1 and 2, end of commit phases 1 and 2, and end of transaction.

During restart, the recovery manager 130 reads the log and determines the state of all active transactions, and coordinates the restart recovery activities of other resource managers (primarily the data manager 110).

The data manager uses a recovery manager service (Extract UR Token) to determine if a unit of work is in progress for the current application instance.

The data manager 110 calls the recovery manager 130 to begin a unit of recovery (BEGIN_UR) when the first update is made to a persistent resource and a unit of recovery has not yet been started.

The recovery manager is called by the connection manager 90 to commit or backout a transaction when an application issues COMMIT or BACKOUT, or when the connection manager observes application termination.

The recovery manager calls the log manager 140 to write transaction state transition log records.

The recovery manager calls the lock manager 150 to release all commit-duration locks after recording on the log the end of a commit or backout operation.

A Recovery Log Manager Component (RLMC)

The log manager (RLMC) 140 maintains an ever increasing sequence of log records written to a recovery log of changes to recoverable data objects. Log records are primarily written by the recovery manager (RMC) 130 who records the beginning, end, and state transitions of units of recovery. The data manager 110 writes "before" and "after" images of data (UNDO/REDO) before making changes to data pages in the disk file.

A log write operation consists of moving a logical record to a virtual storage buffer. When the buffers become nearly full, the log manager initiates an I/O operation to put log information on disk. At certain times in a transaction, specifically during COMMIT and BACKOUT, the recovery manager 130 issues a "force write" request to the log manager, giving the log manager disk address of the log record to be "forced". The log manager initiates an output operation that puts this log record, and all prior log records put into log buffers, onto disk. The issuer of a "force write" is suspended until the requested log record and all its predecessors is written to non-volatile (disk) storage.

The buffer manager also issues a log manager request that suspends the buffer manager until a given log record has been written to the log disk file. This is done to observe the "Write-Ahead Log" rule discussed above (under Buffer Manager).

The recovery manager reads log records during BACKOUT and presents UNDO records to the data manager (DMC). The data manager uses the UNDO log record to restore a disk record to the state that existed before the transaction began.

The recovery manager reads log records during restart to determine the state of each active transaction, and to present REDO and UNDO log records to the data manager.

A Lock Manager Component (LMC or LOCK)

The lock manager 150 provides locking services for the data manager 110—allowing the acquisition, testing, and releasing of a variety of locks during restart and normal processing. The lock manager maintains a virtual storage structure of lock names and associates lock names with the transaction instances that hold these locks.

A given lock name may be requested in a sharing mode or an exclusive mode. An exclusive lock request (X) is granted if and only if no other requests of any type are outstanding (by other transactions) for that lock name. A shared request (S and IX) is granted if the lock has not been granted to any other transaction exclusively. Several transactions may hold the same IX or S lock name concurrently.

The lock manager does not know what the lock names mean; it simply arbitrates uses of the names invented by the data manager 110. Unlike many lock managers that are known in the art, the present system's lock manager does not suspend a caller (i.e. arrange for them to wait) if a lock is not available. If a lock cannot be granted, a failure return code is reported to the data manager. As the lock manager does not suspend callers, it cannot cause deadlock.

The lock manager does not record the lock names in a non-volatile area, and all locks are lost when the system terminates. During restart of indoubt transactions, the data manager reissues lock requests for those resources (queues, pages, and messages) that require relocking. Locks are required only for indoubt transactions; inflight transactions are backed out (and their resources are unlocked).

The lock manager uses a serial machine instruction (Compare and Swap) to grant an exclusive lock to at most one transaction at a time.

The data manager acquires an IX lock using a name derived from the disk address of a given page, and an X-lock using a name derived from the disk address of a given page and logical record representing a message. These locks are called "commit-duration" locks; they are acquired by the data manager when the MQPUT or MQGET operation is being processed, and the locks are released at COMMIT or BACKOUT time when the recovery manager 130 issues a "Release all Commit Duration Locks" request after the COMMIT or BACKOUT (and its logging) has completed.

Thus, the data manager acquires locks and does not remember their names. RMC causes all the locks acquired during a unit of recovery to be released all at once after COMMIT or BACKOUT.

In addition to commit-duration locks, the lock manager supports shared and exclusive "allocation-duration" locks. These locks are used by the message manager at MQOPEN time (i.e. when a queue is opened) to enforce the queue sharing rules, and by the data manager during a Mark Skip Backout operation (as described later) to lock a message during a window when a commit-duration lock is released for one transaction instance and is acquired again shortly thereafter by the same application in a new transaction instance.

The data in a message can be a valuable business asset. The loss of a message that carries a funds transfer, for example, could mean financial losses for a business. Thus, protection of the data being sent between applications is essential. This protection is achieved by not irrecoverably deleting messages from a queue until they have been properly received and processed at the other end of the link. In case the queue manager itself fails, the additional step can be taken of declaring messages to be persistent (recoverable), so that their reinstatement after a system failure is assured.

There are many circumstances in which a number of data updates comprising a particular unit of work must all be completed or none of them must be completed, as mentioned previously. If one of the resource updates raises an error condition so that it cannot be completed then the other updates must be backed out. The present invention is particularly suited to dealing with problems related to such backouts.

Figure 3:
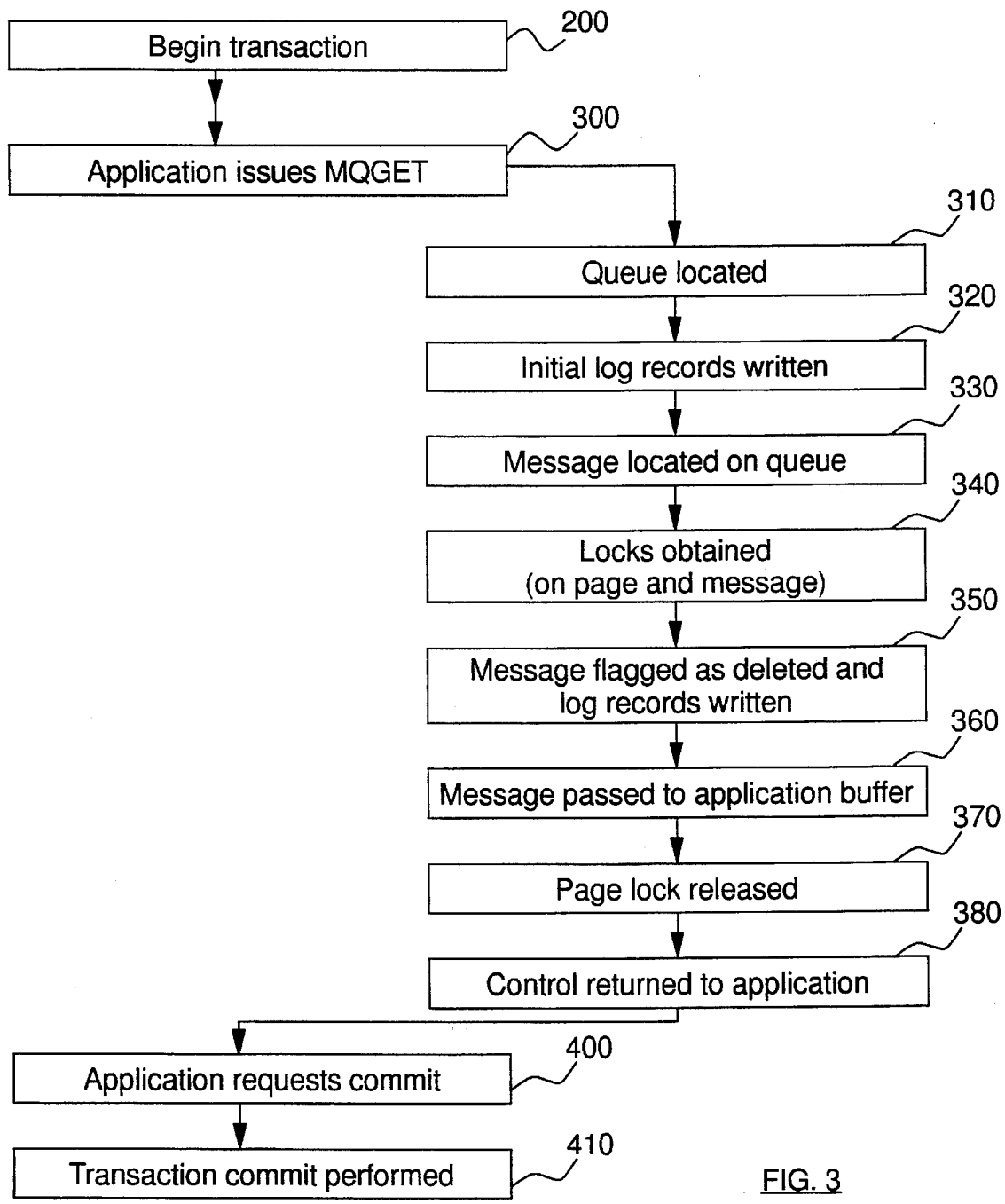
FIG. 3 is a flow diagram showing a conventional application initiated backout procedure.

A method of fault-tolerant transaction-oriented data processing according to an embodiment of the present invention will now be described with reference to FIG. 2 and FIG. 3.

When failures occur in a resource management system such as is described above, application-initiated backouts are distinguished from system-initiated backouts; this being facilitated by the application knowing when it requested a backout itself. Should the transaction suffer a system-initiated backout (e.g. because of abnormal termination of a transaction, power failure, or operator action) during its execution, the entire transaction is backed out. Undo of a specified GET MESSAGE or other operation is optionally skipped only for an application-issued backout.

Data must be protected from three types of failure: subsystem, hardware and application program. The method for reconstructing a data collection after failure is to record in a recovery log the progress of a unit of work representing a transaction from its beginning to its end, and its actions which cause changes to recoverable data objects. The recovery log becomes the source for ensuring either that the unit of work's committed actions are reflected, or that its uncommitted actions are reversed. Where the logged actions reflect data object content, then those records also become the source for reconstruction of a damaged or lost data collection.

The actions which alter recoverable data objects are reflected in the log by UNDO and REDO records. The UNDO log record reflects the content of a data object before the altering action is made. The REDO log record reflects its content after the change. If a failure occurs, the progress state of a unit of work is used in determining which records will be used. If the change is made to the data collection storage medium and the unit of work is "inflight", then the UNDO log record is used during transaction recovery to backout the change in that medium. If the data collection storage medium is non-volatile (e.g. is DASD) and the unit of work is in any state other than "inflight", the REDO log record is used during recovery to ensure the medium copy of the object has been updated.

If a data collection is lost due to media failure, it would be possible to recreate the collection if all REDO log records since the collection was created were saved and available. In practice, a non-volatile copy of the data is made periodically and saved, and the log position at the time the copy was made is noted. Then, if a failure occurs, the recovery log is processed from the remembered position. The REDO records from that point, representing all actions to the data collection which were made by units of work are reprocessed against the saved data collection copy.

An application program has connected to the system and is serving a queue and performing various actions depending on the content of message information it is retrieving from the queue. The recoverable data structure in such a system is a queue. To enable the queue to be returned to a stable state, copies of the queue are regularly made. Log records are written for all changes made to persistent messages on the queue ("persistent" in that they must survive system restarts) between copies of the queue being made. In the event of a system failure occurring, these log records are used, together with the most recently made copy of the queue as a starting point, to reapply all the recorded changes and thereby to recover the queue.

Each transaction may be initiated (step 200) by the application issuing an MQGET (step 300) operation request. This request invokes the connection manager 90, which performs initial setup steps, recognises the request as MQGET, and calls the message manager 100. The message manager locates the appropriate queue (step 310), performs validation, and invokes the data manager component's GET MESSAGE operation to take a message from a local queue. The queue is identified by an object handle and the attributes of the required message are identified by a message descriptor, within the MQGET operation request. Also to be specified within the MQGET operation request is the buffer length (the length in bytes of the area to contain the message data) and certain options (see below) that control the action of the request. The MQGET request may be issued automatically on an instance of the application becoming available to process a new message or on arrival on the queue of a new incoming message.

In performing a GET MESSAGE operation, the data manager locates (step 330) an appropriate message, acquires (step 340) a commit-duration lock on the message and on the page (under the control of the lock manager), moves the message (step 360) to the caller's buffer, flags it deleted (step 350) on the queue and writes log records (step 350) to reflect the deletion. Final disposition of the message does not occur at this stage—not until after a COMMIT operation—so that the messaging system is capable of restoring the message should BACKOUT be requested.

DATA MANAGER GET MESSAGE FLOW

In more detail, the data manager component 110 performs the following actions in retrieving a persistent message within syncpoint scope:

a. DMC calls RMC to determine if a UR has been started, and if not, calls RMC to begin an new UR. RMC then calls log manager (RLMC) to write a BEGIN-UR record (step 320).

b. DMC scans the desired queue for a suitable message.
1) Determines the starting point for the scan.
2) Calls BUFF Get Page to fetch a page.
3) Looks for a suitable message (that is not deleted-)(step 330).
4) If a suitable message is found, performs Set Write Intent on (and latches) the buffer, checks the message's delete flag again (while latched), acquires a commit-duration IX-lock on the page and a commit-duration X-lock on the message (step 340).
5) If either lock request fails, the message is not "suitable" (it is an uncommitted MQPUT). (The outstanding IX lock may be retained).
6) DMC calls RLMC to write an UNDO/REDO record reflecting the deletion of the logical message (step 350).
7) DMC stores the Log Sequence Number of that UNDO/REDO log record into the page-LSN field of the page.
8) DMC sets a delete flag in the disk buffer for the logical record (message) (step 350).
9) DMC moves the message to the application program's buffer (step 360).
10) DMC calls BUFF to Release (unpin) the page and reset write intent (step 370).

c. These steps are repeated as necessary depending on the length of the message. A 4 megabyte message may read a lot of pages, but we deal with it one page at a time. Only the initial message is "dirtied" (changed) as the delete flag is present only in the first part of the message.

The DMC does not remember the names of the locks it acquired, but the lock manager does know them.

The DMC then returns control to the MMC, which in turn returns control to the CMC, and finally to the application.

Figure 4:
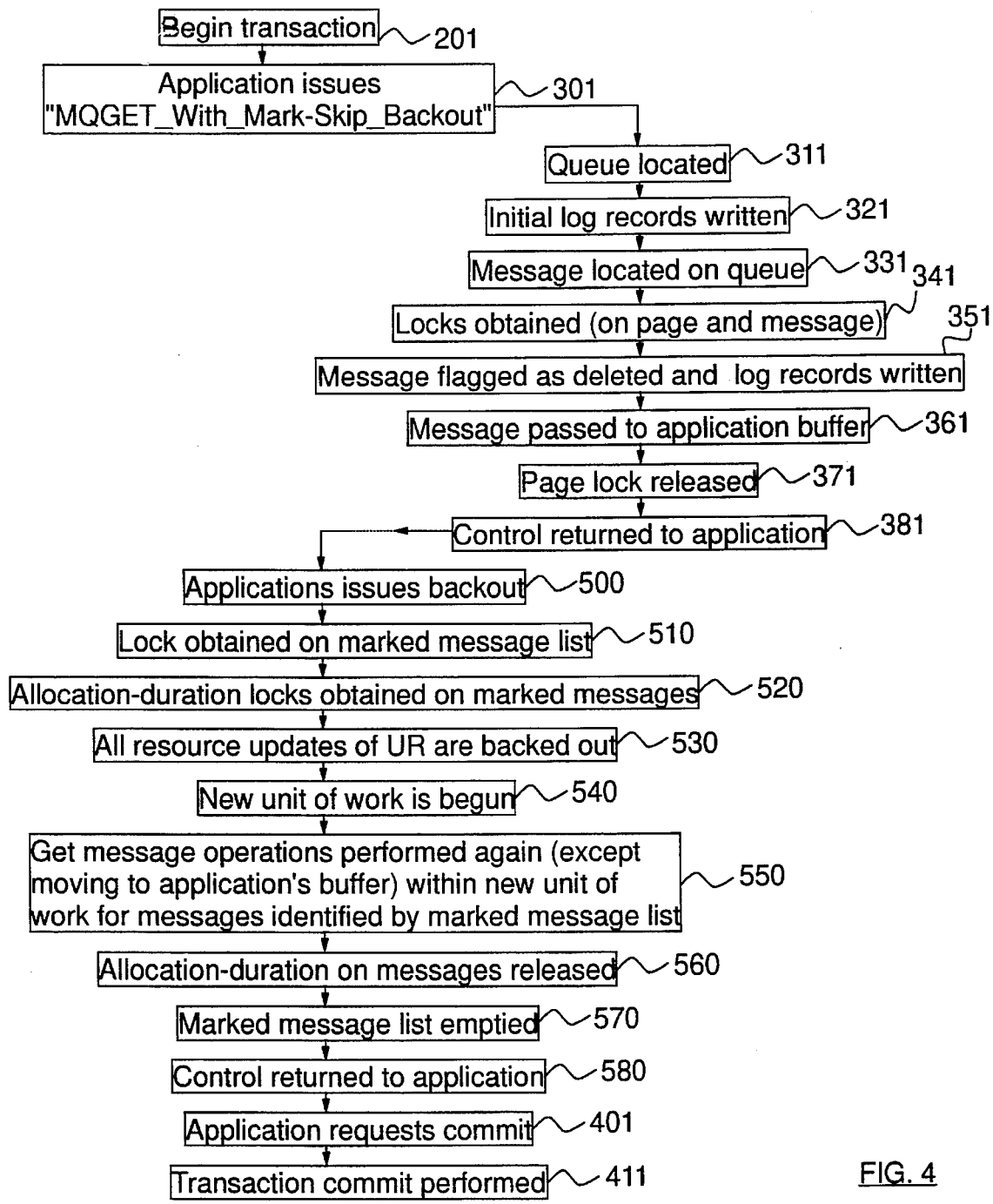
FIG. 4 is a flow diagram showing a backout procedure according to a first embodiment of the invention.

FIG. 4 shows the steps of an alternative backout procedure according to the present invention. One of the options that the application can specify with an MQGET request is that the message be marked; the application issues MQGET_MARK_SKIP_BACKOUT (step 301). Note that a step ending in the number 1 indicates a parallel process to that having the same reference except ending in the number 0.

Where there are differences between the two steps, the differences are described. This is the same as MQGET (above) with the additional step that the data manager 110 records (step 345) the disk address of the gotten message together with its persistence attribute in a private list in storage related to the transaction instance. The DMC has acquired a commit-duration X-lock on this message before placing it in this "marked message list"—i.e. the disk address (or pointer) must represent a message that is locked by this unit of work.

Optional marking is an attribute of the MQGET operation request and not of the message—the application does not know what the next message in the queue will be and so, at the time GET MESSAGE is issued, it cannot use information contained in the message to determine whether or not to mark. However, the application can know what type of message it will get next and this may be used to decide whether the next message is to be marked. Whether or not to choose to mark messages to escape backout may be decided on the basis of which queue the message is to be read from (which is a parameter of the GET MESSAGE request, as noted above). A number of other optional parameters of the MQGET operation request may also be set.

If a first message has already been marked within this unit of work (i.e. if the DMC pointer of the marked message is non-zero), then no other messages may also be so marked. Thus, any unit of work includes only one marked message, but it may include several unmarked messages or none. The rejection of subsequent requests for marking after the first are notified to the application. The messaging system's marked message list is kept in volatile storage (and so does not survive restarts of the messaging system).

Of course, many messages are not transaction-initiating messages, different messages may have very different attributes, and all messages are not necessarily taken from the same queue. It is not desirable to skip backout effects on all messages and so it is not desirable to make the marking of messages to skip backout a general result of a GET MESSAGE operation, which is why it is instead made an option. For example, when a request is made at an ATM for funds withdrawal, an enquiry message as to whether the PIN is correct may be put to a PIN server's message queue within the unit of work. The application will subsequently get a message sent from the PIN server which provides an answer to the enquiry (a GET MESSAGE may be issued, with the option to wait for the arrival of the specific message being chosen). If an error is detected here, it is not desirable to prevent full backout of these PUT MESSAGE and GET MESSAGE operations which are involved in communication with the PIN server.

COMMIT AND APPLICATION TERMINATION

Returning to FIG. 3, let us assume the application is a batch program issuing single-phase COMMIT. Having issued any number (including zero) of MQGET and MQPUT requests, the application program may issue COMMIT. The connection manager 90 recognises the COMMIT request and calls the recovery manager COMMIT-UR service, as described below. The connection manager then returns control to the application.

The connection manager also monitors termination of any connected application program, and can tell whether an application program terminated normally or abnormally.

Normal Application Termination

The MQI specification provides that if an application terminates normally without having issued COMMIT or BACKOUT, outstanding operations are to be committed. The steps of normal application termination are as follows:

1. The Application Program terminates normally.
2. CMC recognises the normal termination and calls the Recovery Manager COMMIT-UR service (see below).
3. CMC calls MMC to perform MQCLOSE operations for any outstanding open queues.
4. CMC calls LOCK to release all request-duration locks and commit-duration locks held by this application.

Recovery Manager COMMIT-UR

This recovery manager service is invoked by the connection manager 90, as referred to above, either as a result of an application-issued COMMIT request or a result of normal application termination. The service steps are as follows:

1. RMC calls Log Manager (RLMC) to write a BEGIN-COMMIT-PHASE-1 log record and a PHASE-1-TO-2-TRANSITION log record.
2. RMC calls RLMC to "force" the log after recording the PHASE-1-TO-2-TRANSITION log record.
3. RMC calls Data Manager (during the Commit Phase 2 broadcast)
4. DMC empties its "Mark Skip Backout" list.
5. RMC calls RLMC to write (but not force) an END-PHASE-2 log record.
6. RMC calls LOCK manager to release all commit-duration locks.
7. LOCK manager releases all commit-duration locks (but not allocation-duration locks) held by this transaction instance.

Application-Issued BACKOUT in the FIG. 4 Embodiment

If, partially through processing, the application discovers some error condition in the message that it is currently processing, the application requests backing out of the resource updates that it has already performed within the present unit of work. The operation flow is as follows:

The application has issued a number (which may be zero) of MQGET and/or MQPUT requests. During MQGET and MQPUT, the data manager 110 will have called the lock manager 150 to get commit-duration locks for the pages (IX locks) and messages (X-locks) referenced.

1. The Application Program issues BACKOUT (500).
2. CMC calls Data Manager to Lock its list of marked messages (step 510).
3. DMC examines its marked message list and calls lock manager to acquire an allocation-duration X-lock on all messages in its "Marked Message List" (step 520). The list is empty if no MQGET operations with the MARK SKIP BACKOUT option have been requested in the current UR. If the marked message list was not empty, a TEST LOCK request is issued to verify that commit-duration locks exist in the current unit of work for this message and page. If the results of these tests is positive, an allocation-duration lock is acquired on the page and an allocation-duration lock is acquired on the message. If the lock requests are granted, the DMC pointer of the marked message and its persistence attribute are returned to the connection manager.
4. DMC indicates, via a return code, whether or not the list of marked messages was empty and whether or not a message was locked.
5. DMC returns a list of marked messages to its caller, the connection manager (which in the present implementation of the invention returns a list of at most 1 marked message ).
6. CMC calls the Recovery Manager ABORT-UR service (which is detailed below) to backout all resource updates performed within this unit of work (step 530). DMC, as part of ABORT-UR, empties its marked message list.
7. If the return code from the DMC "lock marked messages" request (at 4. above) indicates that there were marked messages, CMC calls the DMC "delete marked message" service, presenting the list of marked messages. The DMC pointer of the marked message is passed as a parameter, as well as the message's persistence attribute.
8. DMC verifies that the current transaction holds an allocation-duration X-lock each element of the marked message list. If the lock tests yield positive results, a new unit of work is immediately begun (step 540).
9. DMC performs its GET MESSAGE operations again for each marked message, with the exception of moving the message to the application's buffer (step 550). The fate of messages which were marked is thus transferred to the new unit of work.

Performing GET MESSAGE again includes locating each marked message (although see below, in the paragraph following this description of backout operation flow), acquiring a commit-duration IX lock on the page, commit-duration X-lock on the message, the buffer manager performing Get Page with Set Write intent, RLMC logging of UNDO/REDO, marking the message deleted in the buffer, storing the log record LSN in the buffer, and the buffer manager releasing the page.

The marked messages have both an allocation-duration X-lock (acquired in step 3) and a commit-duration X-lock (acquired in step 9) at this point.

9A. DMC releases the allocation-duration X-locks for the marked messages (step 560). The commit-duration X-locks acquired in step 9 are not released until the new unit of work completes commit or backout.
10. DMC empties (step 270) its Mark Skip Backout list so that if a subsequent BACKOUT is issued by the application no MQGETS are Marked for skip backout.

11. CMC returns control to the application (step 580).

If multiple servers are servicing the input queue, a message that is marked by one server cannot be retrieved by another server unless it is backed out a second time, the mark having been removed the first time.

The reference in the last paragraph to marked messages being "located" may not always be accurate—in practice each marked message is sought rather than definitely being located, for the following reason. An application may issue a PUT MESSAGE operation request (to put a message onto a queue) followed by GET MESSAGE of the same message, as PUT MESSAGE is a partially complete result of a transaction that is visible to that transaction instance (and to no other transaction instance). However, should the transaction issue PUT MESSAGE and then GET MESSAGE MARK SKIP BACKOUT (i.e. issue the operation request for taking a message from a queue and marking the message so that certain operations skip the effects of backout) and then BACKOUT, both the PUT MESSAGE and the GET MESSAGE operations are backed out. Thus, when it comes to delete the marked messages, one or more of them may have already been deleted by BACKOUT of the PUT MESSAGE operation.

Abnormal Application Termination

It was noted above that the connection manager monitors termination of any connected application program, and can tell whether an application program terminated normally or abnormally. The MQI specification provides that if an application terminates abnormally without having issued COMMIT or BACKOUT, outstanding operations are to be BACKED OUT. The operation flow is as follows:

1. The Application Program terminates abnormally.
2. CMC recognises the abnormal termination and calls the Recovery Manager ABORT-UR service (see below).
3. CMC calls MMC to perform MQCLOSE operations for any outstanding open queues.
4. CMC calls LOCK to release all ALLOCATION-duration locks and Commit-duration locks held by this application.

It should be noted that BACKOUT as a result of abnormal application termination is treated differently from BACKOUT as a result of the Application program explicitly issuing BACKOUT. The MARK SKIP ROLLBACK list is NOT examined during this BACKOUT.

Recovery Manager ABORT-UR Function

This function is invoked by the connection manager as a result of either application-issued BACKOUT, or abnormal termination of the application, as was noted above. The operation flow is as follows:

1. RMC calls Log Manager (RLMC) to write (and force) a BEGIN-ABORT log record.
2. RMC calls RLMC to read the log backward reading each UNDO record written by DMC for this transaction instance.
3. RMC calls a DMC routine for UNDO log records as each DMC log record is encountered.
4. DMC, given the UNDO log record, logically reverses the action it did at MQGET or MQPUT time.
   a. Call BUFF Get Page with Set Write Intent
   b. Locate the appropriate logical record (message).
   c. The UNDO action for an PUT MESSAGE operation is to mark the message deleted.
   d. The UNDO action for a GET MESSAGE operation is to remove the delete mark.
   e. DMC constructs a REDO-ONLY "compensating log record" (CLR) from the UNDO record and calls RLMC to write it to the log. The CLR for the UNDO of an PUT MESSAGE, when processed for REDO, causes the message to be deleted. The CLR for the UNDO of a GET MESSAGE, when processed for REDO, causes the message's delete mark to be removed.
   f. The undo-LSN field of a CLR points to the predecessor of the UNDO record it is written for.
   g. The Log Sequence Number (LSN) of the CLR is stored in the page-LSN field of the disk buffer.
   h. DMC calls BUFF to Release the page and reset write intent.
5. When RMC encounters the BEGIN-UR record in its backward scan of UR-related log records, RMC calls RLMC to write an "END-ABORT" log record.
6. RMC calls DMC for the "end of activity scope" broadcast.
7. DMC empties its marked message list. (If we are processing an application-issued BACKOUT, the Marked Message List has been copied to storage controlled by the Connection Manager).
8. RMC calls lock manager to release all commit-duration locks.
9. Lock manager releases all commit-duration locks (but not allocation-duration locks) held by this transaction instance.

In the method implementation described in detail above, marked messages are backed out following application-detected error conditions with their specified excluded operations locked to be retrieved in a new unit of work. The application can subsequently commit the new unit of work to cause the previously-marked message to be deleted from the queue. A reply message, that informs the requester of the fate of the original request, is desirably put within the new unit of work to be sent when the new unit of work is committed.

Figure 5:
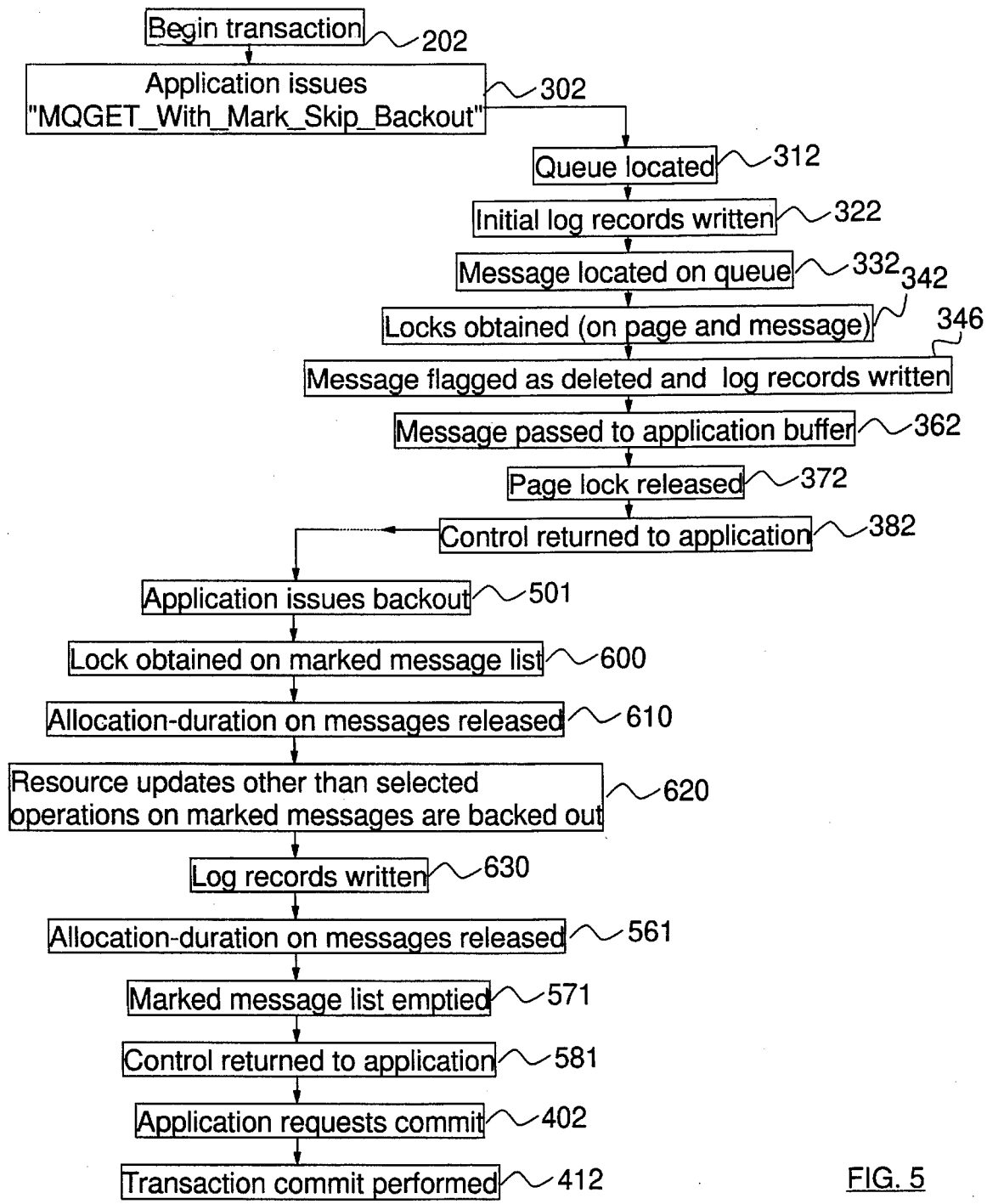
FIG. 5 is a flow diagram showing a backout procedure according to a second embodiment of the invention.

In an alternative implementation shown in FIG. 5, the excluded operations are not backed out but are retained as a partially complete unit of work (step 620). This unit of work is then completed by new operations being added to the retained operations. The end effect of these two method implementations is similar, although the former is easier to implement. When backing out all resource updates, a release of all commit-duration locks can be performed relatively simply, whereas it may be a complex matter to provide a lock manager with lock names (steps 600 and 610) for either all those which are to be released or all those which are to be retained. Furthermore, it may be difficult to ensure that operations which are not backed out are recorded in the log records (step 630) of the new unit of work. A step ending in the number 1 indicates a parallel process to that having the same reference except ending the number 0. A step ending in the number 2 indicates a parallel process to that having the same reference except ending in the number 1. Step 346 parallels step 345.

It will be clear to those skilled in the art that, although the example implementation of the present invention which is described in detail involves marking of transaction-initiating message queuing operations as an option at the time of issuing the operation requests, the method of the present invention is applicable to any resource updates which are to be excluded from the effects of an application-issued backout request but are to participate normally in other types of backout, and is not limited to determining only at the time of issuing a resource update request whether the resource update is to be excluded.

We claim:

1. A method of fault-tolerant transaction-oriented data processing in which resource updates performed by a first application program are made permanent and visible to other application programs only on successful completion of the transaction, and are backed out following discovery of an error condition prior to successful completion, comprising the steps of:

initiating execution of a first unit of work, said first unit of work including one or more operations initiated by said first application program;

specifying whether operations within said first unit of work are to be excluded from the effects of application-requested backouts following detection of error conditions within said first unit of work;

responsive to detection of an error condition by said first application program, backing out resource updates performed in said first unit of work whilst ensuring that excluded operations are not made available to other application programs and are not backed out by said backing out step;

establishing a unit of work which includes said excluded operations.

2. A method according to claim 1, wherein:

said ensuring step includes the step of acquiring request duration locks on said excluded operations to prevent said excluded operations from being made available to other application programs.

3. A method according to claim 2, further including the steps of:

performing said established unit of work;

releasing said request-duration locks after said performing step.

4. A method according to claim 1 wherein said excluded operations include a transaction-initiating operation.

5. A method according to claim 1, further including the steps of:

marking excludable operations;

storing a list of pointers to said excluded operations; and examining said stored list during said ensuring step to locate said excluded operations.

6. A method according to claim 1 in which inter-program communication between application programs is carried out using message queuing and in which transaction requests comprise messages sent to queues, wherein committing said established unit of work causes a faulty message which raised an error to be deleted from the message queue.

7. A method according to claim 1 wherein said ensuring step includes the step of acquiring request duration locks on said excluded operations to prevent said excluded operations from being made available to other application programs.

8. A method according to claim 7, further including the steps of:

performing said established unit of work;

releasing said request-duration locks after said performing step.

9. A fault-tolerant transaction-oriented data processing system including an inter-program communications manager providing communications services between application programs, in which resource updates performed by a first application program are made permanent and visible to other application programs only on successful completion of the transaction, and are backed out following discovery of an error condition prior to successful completion, the system comprising:

means for specifying, within an instruction issued by said first application program, whether an operation within a first unit of work is to be excluded from the effects of application-requested backouts following detection of error conditions within said first unit of work;

means within said inter-program communications controller, responsive to detection of an error condition by said first application program, for backing out resource updates performed in said first unit of work;

means for ensuring that any excluded operation is not made available to other application programs and is not backed out by said backing out means; and means within said inter-program communications controller for establishing a unit of work which includes said excluded operations.

10. The system of claim 9, further including:

means for marking excludable operations;

means for storing a list of pointers to said excluded operations;

means within said ensuring means for examining said list to locate said excluded operations.

* * * * *